US011630913B2

(12) United States Patent
Aoudia et al.

(10) Patent No.: US 11,630,913 B2
(45) Date of Patent: Apr. 18, 2023

(54) ENCRYPTED TEXT SEARCHING

(71) Applicant: Via Science, Inc., Somerville, MA (US)

(72) Inventors: Madjid Aoudia, Montreal (CA); Kai Chung Cheung, Markham (CA); Jesús Alejandro Cárdenes Cabré, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 17/750,490

(22) Filed: May 23, 2022

(65) Prior Publication Data

US 2022/0382900 A1 Dec. 1, 2022

Related U.S. Application Data

(60) Provisional application No. 63/192,811, filed on May 25, 2021.

(51) Int. Cl.
*H04L 29/06* (2006.01)
*G06F 21/62* (2013.01)
*H04L 9/00* (2022.01)
*H04L 9/30* (2006.01)

(52) U.S. Cl.
CPC ......... *G06F 21/6227* (2013.01); *H04L 9/008* (2013.01); *H04L 9/30* (2013.01)

(58) Field of Classification Search
CPC ........ G06F 21/6227; H04L 9/008; H04L 9/30
See application file for complete search history.

(56) References Cited

U.S. PATENT DOCUMENTS

2019/0140818 A1   5/2019  Bent et al.
2020/0125563 A1*  4/2020  Fan .................. H04L 9/0894

OTHER PUBLICATIONS

International Search Report and Written Opinion issued in International Application No. PCT/US2022/030488, dated Aug. 17, 2022, 16 pages.
Kuelong Dai et al., "An Efficient and Dynamic Semantic-Aware Multikeyword Ranked Search Scheme Over Encrypted Cloud Data," in IEEE Access, vol. 7, Sep. 30, 2019, (retrieved on Oct. 8, 2019), pp. 142855-142865.
Qin Hu et al., "Messages in a Concealed Bottle: Achieving Query Content Privacy with Accurate Location-Based Services," in IEEE Transactions on Vehicular Technology, IEEE, vol. 67, No. 8, Aug. 2018, (retrieved on Aug. 13, 2018), pp. 7698-7711.

* cited by examiner

*Primary Examiner* — Beemnet W Dada
*Assistant Examiner* — Leynna Truvan
(74) *Attorney, Agent, or Firm* — Pierce Atwood LLP

(57) ABSTRACT

A first system receives an encrypted data vector representing a text search query from a second system and second encrypted data from a third system that may include a first vector and a second vector representing text of an electronic document. The first system may multiply the vectors by a random vector. The first system may determine a first difference between the encrypted data vector and the first vector, and a second difference between the encrypted data vector and the second vector. The first system may determine a product of the first and second difference. The first system may send the product to the third system and then receive a value representing the decrypted difference. The first system may determine if the value satisfies a condition and send the result of the determination to the second system.

20 Claims, 9 Drawing Sheets

ENCRYPTED TEXT SEARCHING

CROSS-REFERENCE TO RELATED APPLICATION DATA

This application claims the benefit of and priority to U.S. Provisional Patent Application No. 63/192,811, filed May 25, 2021, and entitled "Private Search," in the name of Madjid Aoudia et al. The above provisional application is herein incorporated by reference in its entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic-curve cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF DRAWINGS

For a more complete understanding of the present disclosure, reference is now made to the following description taken in conjunction with the accompanying drawings.

SUMMARY

Figure 1:
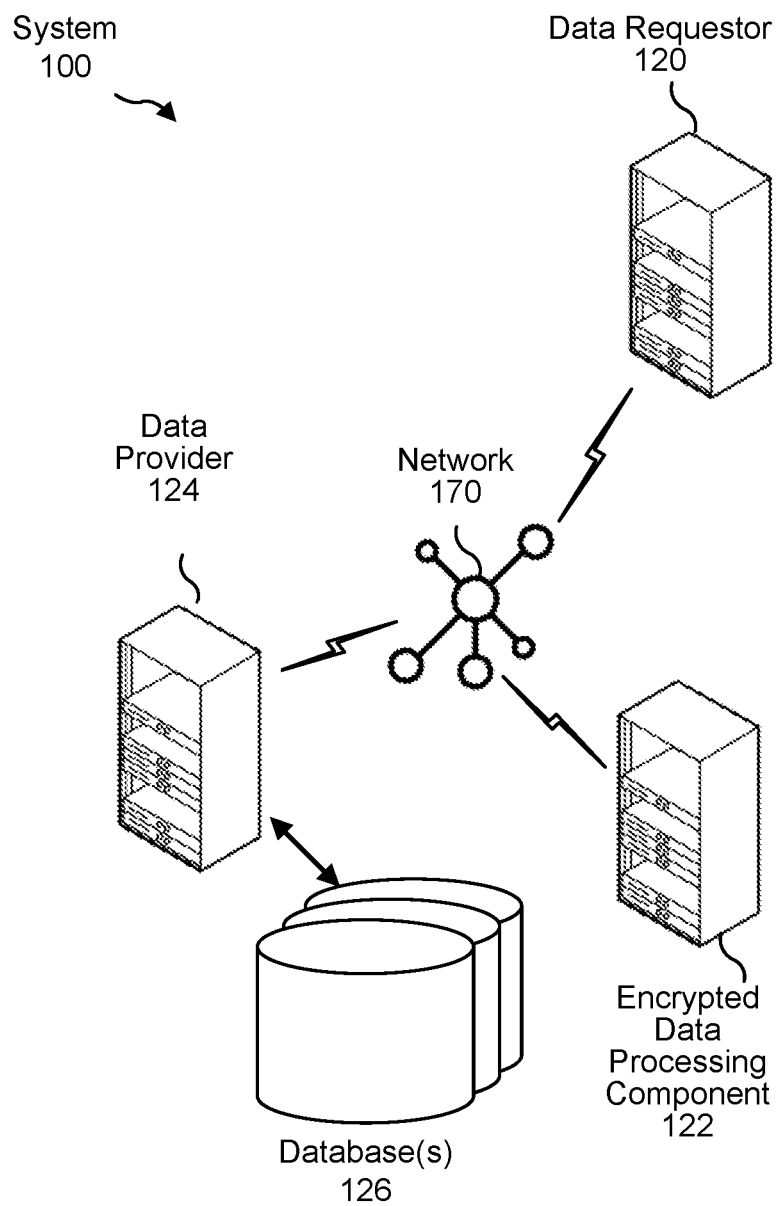
FIG. 1 illustrates a system configured to perform a private search according to embodiments of the present disclosure.

In various embodiments of the present disclosure, a first system (such as an encrypted data processing component) may receive, from a second system (such as a data requestor) first encrypted data vector representing a text search query. The first system may receive, from a third system (such as a data provider) second encrypted data, the second encrypted data including a first vector and a second vector representing text of an electronic document. The first system may determine third encrypted data representing a first difference between the first encrypted data vector and the first vector of the second encrypted data and fourth encrypted data representing a second difference between the first encrypted data vector and the second vector of the second encrypted data. The first system may then determine fifth encrypted data representing a first product of the third encrypted data and the fourth encrypted data. The first system may send the fifth encrypted data to the third system. The first system may receive, from the third system, first decrypted data representing a value of the fifth encrypted data. The first system may determine first decrypted data satisfies a condition and determine results data for the text search query based on the first decrypted data satisfying the condition. The first system may send the results data to the second system.

DETAILED DESCRIPTION

Many types of data is private or highly sensitive, such as financial and medical records. While this data must be controlled and measures should be taken to protect data that includes sensitive information such as personally identifiable information (PII), etc. opportunities may exist for learning from the data as a whole but without exposing individual records or PII. A data custodian may be a controller of private data which permits access to the data in the right conditions or sufficient data abstraction.

As data privacy is a major concern for data custodians, providing query or search capabilities over private datasets may be impossible or very difficult. The problem arises, in one example, as data custodians prefer to not make data fully accessible for purposes of operations such as a query or search as this may potentially expose PII or other sensitive information. Solutions may include a data custodian providing limited access of the data to clients that do not need full access to the data, such as clients that wish to extract specific and relevant pieces of information for an application. Examples of such extraction applications may include applications used in the medical and pharmaceutical arenas where patient records must remain private but while also allowing medical research agencies to access information about the frequency of medical conditions or side effects of drugs. Other examples may include private communication applications, such as private email and instant messaging, where the same user needs to search over data which needs to remain encrypted at rest.

An example scenario may concern accessing confidential medical records. A data custodian may manage a database of confidential medical records. The confidential medical records may include patient personal information, such as name, address, and age, as well as including conditions for which the patient received treatment and further described with symptoms, diagnosis information, and treatments including drugs, posology, treatment effects and side-effects. To ensure the data stays private, the medical records may not be stored in plain text. Additionally, a plain text version of a search index for medical records data may reveal private information using simple dictionary attacks.

A pharmaceutical company, or data requestor, may wish to obtain medical record data to conduct research about the side effects of one of their drugs. The data requestor does not have access to the medical records in plain text. However, the data requestor is trying to answer a simple question: Does any patient receiving the particular drug present any symptoms in a known set of symptoms. Thus, the data requestor does not need any patient identifying information. Instead, the data may be limited to information about the medical experiences of patients taking the particular drug to satisfy the research needs.

The data custodian may encrypt the medical records database and may hold the encryption key pair. Additionally, the data requestor's research may be confidential and they may not want to expose the data request or query to the data custodian. For example, if queries by the pharmaceutical company for a particular drug and medical conditions was made public, unfounded speculation may be made about the drug's side effects. Further, the data custodian may rely on a cloud based search engine and delegate hosting the search operations to a third party. Thus third party may also provide non-disclosure of the data requestor's search terms.

Embodiments of the present disclosure thus relate to systems and methods for identifying matches to search terms from the data requestor in the encrypted database of the data custodian. This may include techniques for the data custodian hosting the encrypted database and the data requestor accepts the search query exposure to the data custodian. This may include techniques for the third party, or encrypted data processing component, holding the encrypted database or encrypted search index(es) of the database and receiving encrypted search queries from the data requestors. Thus, limiting exposure between the data custodian and the data requestor.

The method and techniques described herein may use a word embedding to build a representation of the database, or search corpus, which is then encrypted using a Homomorphic Encryption system capable of addition and multiplication, such as a Fully Homomorphic Encryption (FHE) scheme. The encrypted word embedding representation of the search corpus may serve as a search index for performing search operations. This may provide for corpus data privacy as the search corpus is encrypted at all times and query privacy as the query terms are never revealed to the data owner. Additionally, benefits may include delegation of the search operation to a trusted third party that may execute in the cloud and a non-cost prohibitive execution time. The techniques described herein may offer better search performance than other encrypted searches as this utilizes a binary search tree, and thus the search operation cost is logarithmic.

In some embodiments, the data provider component, encrypted data processing component, and/or data requestor and/or query component encrypt and/or de-crypt data in accordance with an encryption technique, such as Rivest-Shamir-Adleman (RSA) encryption, elliptic-curve encryption, or any encryption that is homomorphic (partially or fully); in these embodiments, the components may transmit, to the other components, only encrypted data.

FIG. 1 illustrates a system 100 that includes a data requestor 120, a data provider 124, one or more databases 126, an encrypted-data processing component 122, and a network 170. The network 170 may include the Internet and/or any other wide- or local-area network, and may include wired, wireless, and/or cellular network hardware. The data requestor 120 may communicate, via the network 170, with one or more data providers 124 and/or one or more encrypted data processing components 122. The encrypted data processing component 122 may transmit, via the network 170, data to and/or from the other systems using one or more application programming interfaces (APIs). Each API may correspond to a particular application. A particular application may, for example, be operated within the encrypted data processing component 122. The transmissions between the data requestor 120, the data provider 124, and the encrypted-data processing component 122, via the network 170, may use secure channels, such as using encrypted communication channels.

The data provider 124 may control access to data, such as data stored in database(s) 126. The data in the database(s) 126 may be encrypted. The data provider 124 may provide searchable information about the data in the database(s) 126 to the encrypted data processing component 122, such as encrypted search indexes as described in reference to FIG. 2. The data requestor 120 may request a search query of the data in the database(s) 126 via the encrypted data processing component 122. The search query may be encrypted. As described in relation to FIGS. 3A-3C, 4, and 5, the encrypted data processing component 122 may multiply the encrypted search indexes and the encrypted search query by a random vector, or salt, to prevent the data or query exposure to either the data requestor 120 or the data provider 126.

Figure 2:
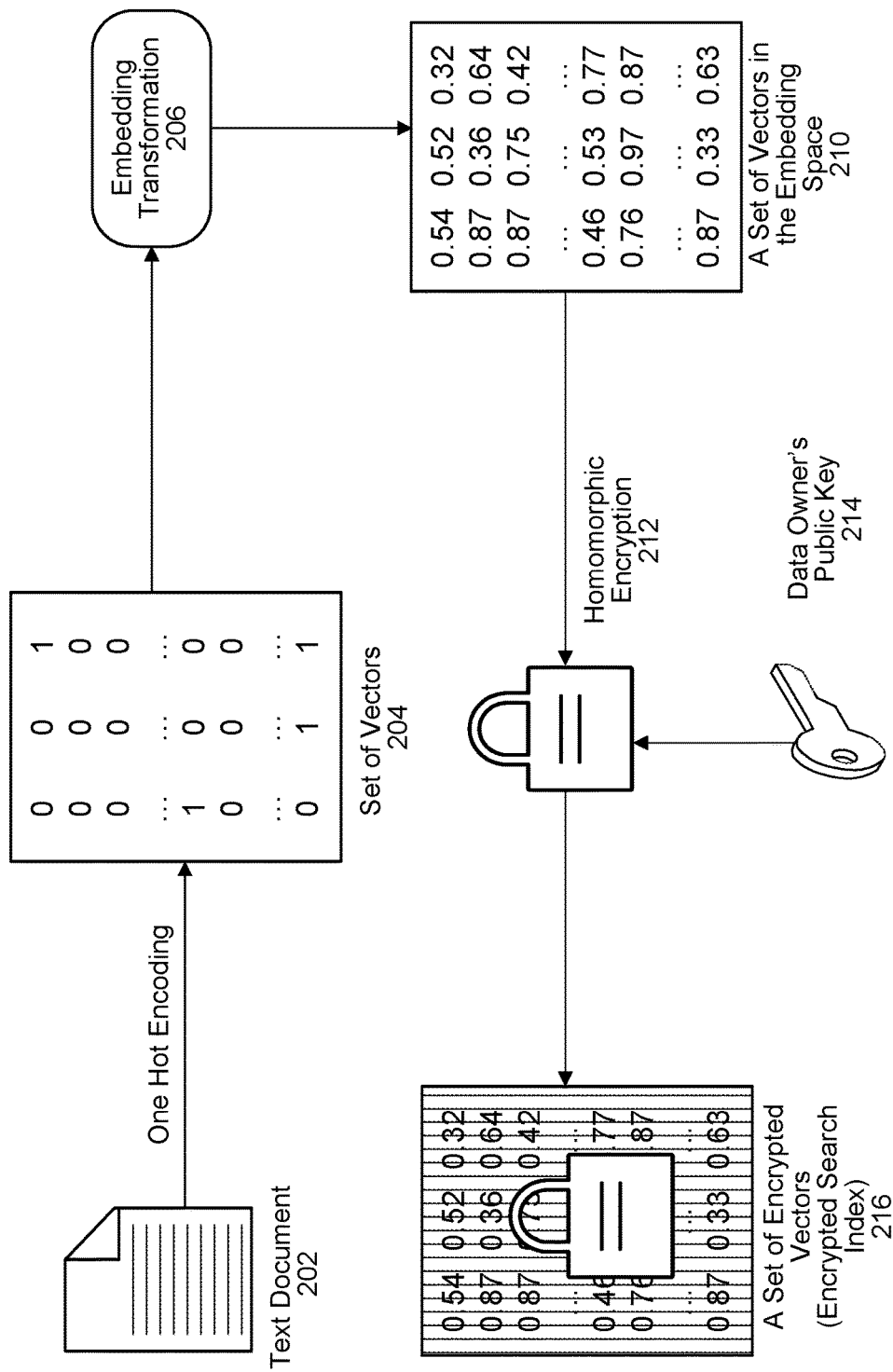
FIG. 2 illustrates an example process for generating the encrypted search index, in accordance with some embodiments.

FIG. 2 illustrates an example process for generating the encrypted search index, in accordance with some embodiments. A data custodian, or data provider 124, may have databases of documents, for example, patient medical records as previously discussed or other documents that include sensitive information. When searching unencrypted data, a search index is a common tool used for improving the speed and results of a search. While search indexes may have many forms, commonly a search index is an identification document(s) (or data items) that include key terms or keywords that may be found in the underlying documents in the database/corpus. In some embodiments, the data provider 124 may build encrypted search index(es) for searching the materials within the database.

Each document in the databases of the data provider 124 may be transformed into a bag-of-words representation. The bag-of-words model is text of a document represented as the list of its included words and disregards grammar and word order, but may record the multiplicity of words. Such a bag-of-words representation may then be used to identify words in particular documents for searching purposes.

As shown in FIG. 2, the text document 202 is transformed into the bag-of-words representation. A one-hot encoding is applied to the bag-of-words representation to generate a set of vectors 204 in an n-dimensional space. An embedding transformation 206 is then applied to the set of vectors 204. The Levenshtein edit distance is an example of one of many types of word embedding transformations that may be used. The Levenshtein edit distance reflects the number of edits between the words of the text document 202. In this example, the Levenshtein distance represents the minimum number of single-character edits required to change one word (str1) into another (str2). The word embedding is built by minimizing the loss function of equation (1) over a corresponding corpus, with str1 and str2 representing two words in the corpus and $\vec{v}_{str1}$ and $\vec{v}_{str2}$ being the vector representations:

$$L = \sum_{str1, str2 \in corpus} \left( (\vec{v}_{str1}, \vec{v}_{str2})^2 - lev(str1, str2) \right)^2 \qquad (1)$$

The set of vectors in the embedding space 210 is a result of the function of equation (2), where H is the word embedding transformation and $Bag_d$ is the bag-of-words representation of document d.

$$\vec{v} = H(s) \text{ for } s \in Bag_d \qquad (2)$$

Through the bag-of-words representation and the embedding transformation 206, such as using the Levenshtein edit distance, each document in the search corpus, such as the text document 202, is transformed into a set of vectors in the embedding space 210. A homomorphic encryption 212 is performed to encrypt the set of vectors in the embedding space 210. The homomorphic encryption 212 may use a public key 214 provided by the data owner, or data provider 124. A set of encrypted vectors 216 may result from performing the homomorphic encryption 212 on the set of vectors in the embedding space 210. Through the use of homomorphic encryption, homomorphic operations may be used that are part of the search operations described in reference to FIG. 1 and FIGS. 3A-3C. The homomorphic operations may include encrypted addition, encrypted multiplication, and multiplication of encrypted and non-encrypted numbers.

An encryption function may be defined as $\varepsilon(K_{public}, K_{private})$ where $K_{public}$, $K_{private}$ may be the public key 214, and corresponding private key, owned by the data provider. Thus, the encryption function for encrypting the set of vectors in the embedding space 210 into the set of encrypted vectors 216 may be expressed as equation (3).

$$\vec{e_v} = \begin{bmatrix} \varepsilon(v_1) \\ \ldots \\ \varepsilon(v_n) \end{bmatrix} \quad (3)$$

The set of encrypted vectors 216 may be stored by the data provider 124, such as in the database(s) 126. As previously noted, the embedding and encryption process described in relation to FIG. 2 is performed for the text document 202. The set of encrypted vectors 216 may be stored along with an identifying record id corresponding to the text document 202. For each text document 202 stored in the database(s) 126, a set of encrypted vectors 216 may be generated and stored accordingly. The data provider 124 may identify a set of text documents stored in the databases 126 for searching. As described, each of these text documents may be transformed and encrypted as a set of encrypted vectors 216. The set of encrypted vectors 216 associated with the identified set of text documents for searching may form the encrypted search index.

Using the process described in relation to FIG. 2, a data provider 124 may encrypt the text of documents 202 stored in the database(s) 126 to keep the data of the text documents 202 private. While such an encryption operation protects the contents of the documents, it also prevents a traditional search query from being performed. This includes search queries which would not result in the exposure of PII, such as the example above to identify the number of patients that are taking a particular drug and experiencing a medical side effect. In some embodiments, the method and techniques described herein may encrypt and perform the similar transformations to the search terms such that searching the encrypted data of the data provider 124 may be possible without exposing the underlying data.

The searching for matches of a search term in the set of encrypted vectors 216 may be equivalent to finding elements of the set that are equal to the encrypted search vector that results from applying the same encryption and transformation to the search term that was applied to generate the set of encrypted vectors. This is essentially identifying matches between the encrypted search vector and the encrypted vectors of the search index. Using the symbol $\stackrel{\circ}{=}$ to denote the encrypted comparison, then searching for a term t is the equivalent of finding $\vec{e_v}$, such as in equation (4).

$$\|\vec{e_t}, \vec{e_v}\| \stackrel{\circ}{=} 0 \quad (4)$$

As previously noted, the data query requestor may request a search directly from the data provider 124 if the data requestor 120 accepts that the search query is exposed to the data provider 124. The data provider 124 may receive the search terms from the data requestor 120. The data provider 124 may transform and encrypt the search terms to then perform the comparison operations of the between the encrypted search vector and the stored encrypted vectors corresponding to the text documents. While this does expose the search terms of the data requestor, a concession the data requestor must agree to, the data provider's 124 data is secure because the data at rest stays encrypted. The advantage of such a scenario is that the data provider's 124 data stays encrypted at rest and the data provider does not have to decrypt the data, thus lowering the risk of data leaks.

In another embodiment, the search may be delegated to a third party, or encrypted data processing component 122. The data requestor 120 may prefer to keep their search terms private, such as the example of a pharmaceutical company that does not want to expose possible side effects of a drug. In this embodiment, the data provider 124 may delegate the search operation to a third party, such as the encrypted data processing component 122.

Figure 3A:
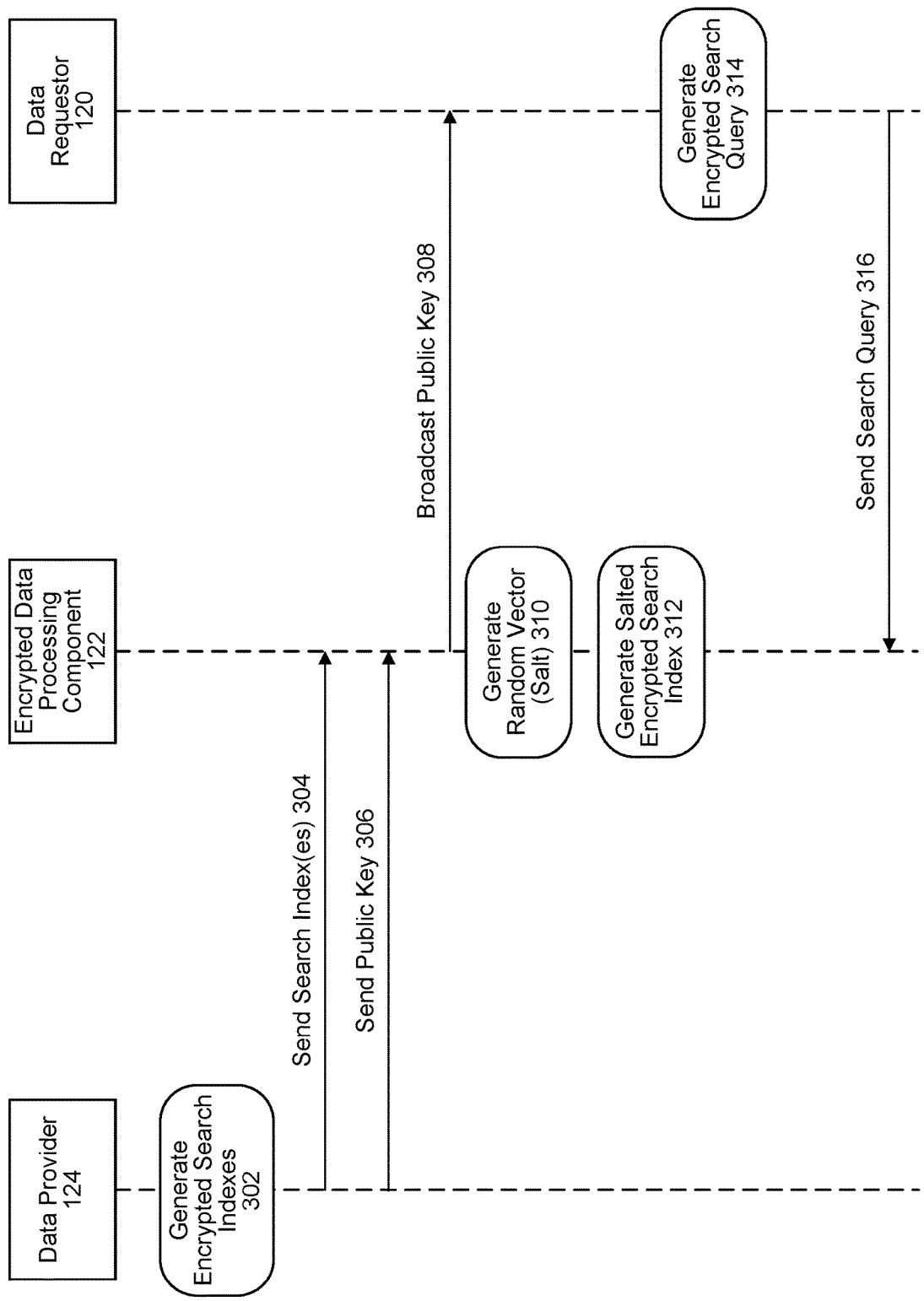
FIGS. 3A-3C illustrate an example process for a delegated search of an encrypted search index, in accordance with some embodiments.
Figure 3B:
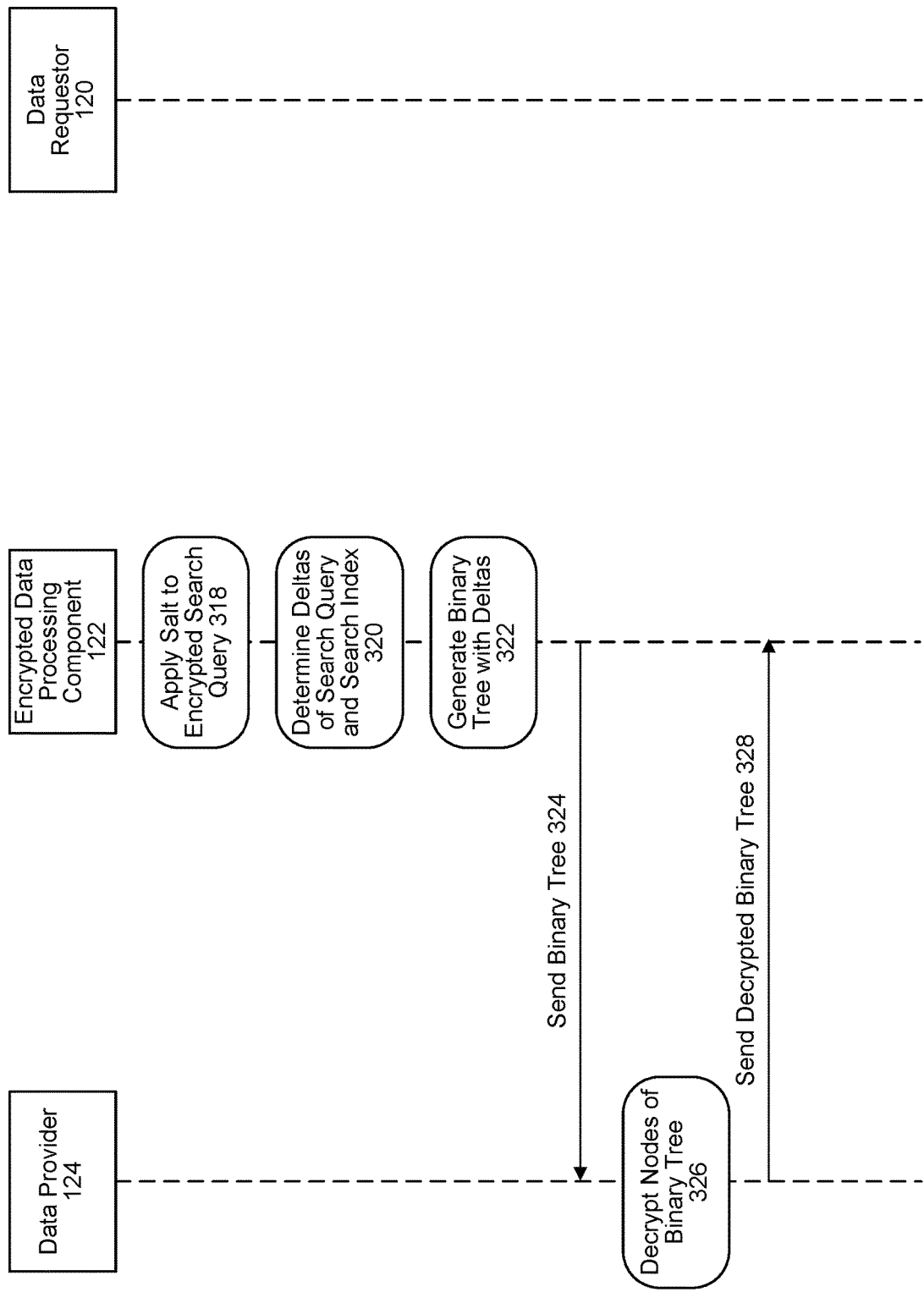
Figure 3C:
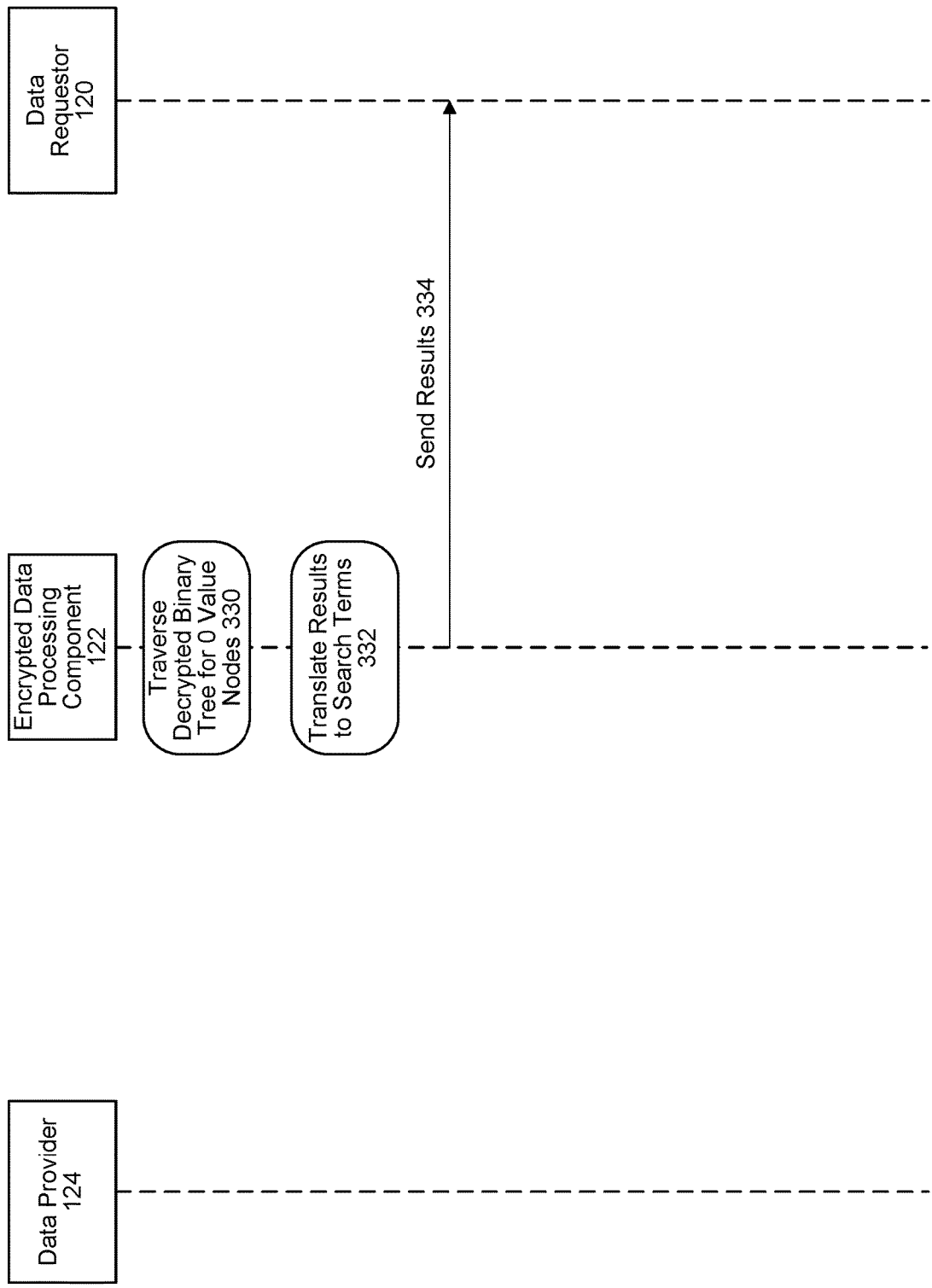

FIGS. 3A-3C illustrate an example process for a delegated search of an encrypted search index, in accordance with some embodiments. As described in reference to FIG. 1, the delegated search may comprise at least three components: the data requestor 120, the data provider 124, and the encrypted data processing component 122. The encrypted data processing component 122 may be a third part that receives encrypted data from both the data requestor 120 and the data provider 124 while not decrypting data from either. This prevents the data provider 124 from accessing and decrypting the encrypted search terms as the encrypted search terms are encrypted with a public key provided by the data provider 124. Additionally, the data provider 124 only provides the encrypted search index, which has been both encrypted and transformed by an embedding, to the encrypted data processing component 122.

As shown in FIG. 3A, the data provider 124 may generate (302) the encrypted search index for the text documents of a document corpus stored in the databases(s) 126 in accordance with the process described in reference to FIG. 2. The data provider 124 may send (304) the encrypted search index to the encrypted data processing component 122. The encrypted search index may be the set of encrypted vectors $\vec{e_j}$, j=1 . . . m representing the text document 202. The data provider 124 may send (306) a public key to the encrypted data processing component 122, with the public key being the same public key used to encrypt the search index sent to the encrypted data processing component 122. The public key is part of a public/private key pair where the data provider 124 holds the private key.

The encrypted data processing component 122 may broadcast (308) the public key to clients, such as the data requestor 120, that may want to query the search index of the data provider 124. The encrypted data processing component 122 may generate (310) a random vector $\vec{r}$ to use as salt and obscure both the search index and the search query. The random vector $\vec{r}$ may be the same dimension as the encrypted corpus vectors of the search index. The encrypted data processing component 122 may generate (312) a salted encrypted search index for the encrypted search index by computing the inner product of the random vector with encrypted vectors, as represented in equation (5).

$$\vec{r} \cdot \vec{e_j} \quad (5)$$

The data requestor 120 may identify a set of search terms for searching the corpus of the data provider 124. Using the same embedding transformation and the received public key, the data requestor may generate (314) an encrypted search query $\vec{q}$ of the same dimension as the corpus, using the identified set of search terms. The data requestor 120 may send (316) the encrypted search query to the encrypted data processing component 122 for executing the search.

As shown in FIG. 3B, the encrypted data processing component 122 may apply (318) the salt, or random vector $\vec{r}$, to the encrypted search query, represented as $\vec{r} \cdot \vec{q}$. The same encryption and transformation have been applied to the search query and the search index, as well as determining the inner product of the random vector $\vec{r}$ with the encrypted search query $\vec{q}$ and each vector of the set of encrypted vectors $\vec{e}_j$, j=1 . . . m. The encrypted data processing component 122 may then determine (320) the differences, or deltas, between the encrypted search query 4 and each vector of the set of encrypted vectors $\vec{e}_j$, j=1 . . . m, as represented in equation (6).

$$\sigma_j = \vec{r} \cdot \vec{e}_j - \vec{r} \cdot \vec{q} \qquad (6)$$

Calculating the difference for each vector of the set of encrypted vectors may result in a set of deltas $\delta_1, \delta_2, \ldots \delta_n$. The encrypted data processing component 122 may generate (322) a binary tree from the set of deltas. The encrypted data processing component 122 may generate the binary tree by starting with the deltas $\delta_1, \delta_2, \ldots \delta_n$ as the leaf nodes of the binary tree and recursively multiplying pairs of deltas to generate the parent brand nodes of the leaf nodes. For example, the parent branch nodes of the leaf nodes of the binary tree may comprise the product pairs $\delta_1 \cdot \delta_2$, $\delta_3 \cdot \delta_4, \ldots \delta_{n-1} \cdot \delta_n$. The next level above branch nodes may then be calculated as the product of the previous lower branch nodes, such as $(\delta_1 \cdot \delta_2) \cdot (\delta_3 \cdot \delta_4), \ldots (\delta_{n-3} \cdot \delta_{n-2}) \cdot (\delta_{n-1} \cdot \delta_n)$. The recursion continues until the root node of $\delta_1 \cdot \delta_2 \cdot \ldots \delta_n$.

Upon generation of the binary tree, the encrypted data processing component 122 sends (324) the binary tree to the data provider 124. Using the private key, the data provider 124 may decrypt (326) the nodes of the binary tree. While this may allow for the data provider 124 to identify which nodes indicate a match of the search terms and the search index, because of the multiplication with the salt, or random vector $\vec{r}$, the data provider 124 is not able to translate the values of the matched nodes back to the search index. Thus, the search query is kept private from the data provider 124. The data provider 124 may send (328) the decrypted binary tree to the encrypted data processing component 122. The communication between the encrypted data processing component 122 and the data provider may use an encrypted data channel, such as to prevent exposure of the decrypted binary tree.

As shown in FIG. 3C, the encrypted data processing component 122 may traverse the decrypted binary tree to identify nodes with a value of zero. Traversing the zero value nodes may result in identifying the zero value leaf nodes. The zero value leaf nodes may correspond to the search index terms which match the search query terms. The traversal and identification of the matching terms is further described in reference to FIG. 4.

From the traversal of the decrypted binary tree, the encrypted data processing component 122 may identify leaf nodes with a value of zero. If the root node of the decrypted binary tree does not have a value of zero, then no matches may exist between the search query terms and the search index terms.

In some instances, identifying a node with a zero value such that $\vec{e}_j - \vec{q} = 0$ for the set of encrypted vectors $\vec{e}_j$, j= 1 . . . m, may not be sufficient to identify a true term match. The computation of $\delta_j = \vec{r} \cdot \vec{e}_j - \vec{r} \cdot \vec{q}$ using the random vector $\vec{r}$ may increase the likelihood of identifying a true match. By multiplying both the encrypted search query $\vec{q}$ and each vector of the set of encrypted vectors $\vec{e}_j$, j=1 . . . m by the random vector $\vec{r}$, an inference about either may not be made if the decrypted $\delta_j$ is discovered. However, in some embodiments, to increase certainty of the match, many linearly independent vectors $\vec{r}$ may be used to form a matrix R. The matrix R may have rank between 1 and the number of components in the vectors $\vec{e}_j$ and $\vec{q}$. For example, using a matrix R of full rank, if the calculation of $R \cdot (\vec{e}_j - \vec{q})$ is equal zero, then the match is confirmed. This is because there is only a true match when $\vec{e}_j - \vec{q}$ is the zero vector as $R \cdot (\vec{e}_j - \vec{q}) = R^{-1} 0 = 0$. In some embodiments, determining the $\delta j$, or difference value, is equal to zero may identify a potential match. In some embodiments, multiplying the $\delta_j$, or difference value, by invertible matrix R may confirm the match.

In some embodiments, the encrypted data processing component 122 may traverse the decrypted binary tree to identify the leaf nodes with a value of zero, or the zero deltas. Each of these identified leaf nodes may be tested using the R matrix to confirm the term match. The R matrix may be used when there are multiple instances that a delta is equal to zero to determine a true match.

The encrypted data processing component 122 translate (332) the identified matches from the decrypted binary tree and, in some embodiments, may confirm the match using the R matrix. The encrypted data processing component 122 may send (334) the results to the data requestor 120, such as whether a true match has been found or not. In some embodiments, data identifying where the match has been found may be transmitted as part of the results data to the data requestor 120. For example, the encrypted data processing component 122 may identify the number of documents in the corpus which had terms that matched the search query terms.

Figure 4:
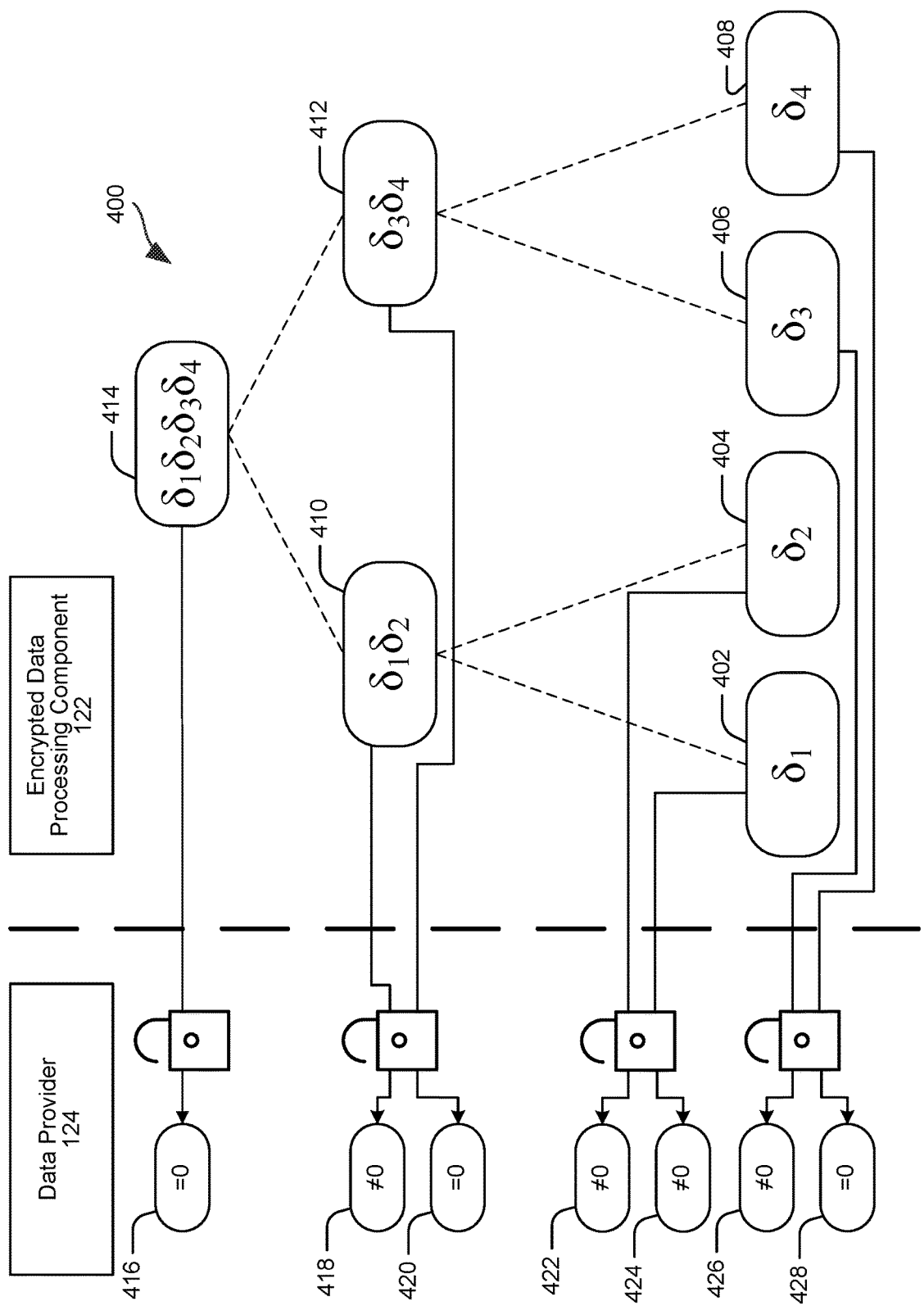
FIG. 4 illustrates an example encrypted binary tree, in accordance with some embodiments.

FIG. 4 illustrates an example encrypted binary tree, in accordance with some embodiments. As described in operation 322 of FIG. 3B, the encrypted data processing component 122 may generate a binary tree from the deltas. In the example illustrated in FIG. 4, the operation 320 may determine a set of deltas, such as $\delta_1, \delta_2, \delta_3$, and $\delta_4$ by determining the difference between the encrypted search query q and each vector of the set of encrypted vectors $\vec{e}_j$, j=1 . . . m, as represented in equation (6). In other words, the set of deltas represents the vector difference between each word of the search index corresponding to a document and the search term of the search query. The set of deltas may be the leaf nodes of the binary tree, such as leaf nodes 402, 404, 406, 408, with respective encrypted values of $\delta_1, \delta_2, \delta_3$, and $\delta_4$. The binary tree may be built by recursively multiplying pairs of deltas from the set of deltas. For example, the product of leaf nodes 402 and 404 may be the parent branch node 410 with an encrypted value of $\delta_1 \delta_2$. Additionally, the product of leaf nodes 406 and 408 may be the parent branch node 412 with an encrypted value of $\delta_3 \delta_4$. Finally, as the example binary tree in FIG. 4 began with four leaf nodes, the product of the branch nodes 410 and 412 may be the root node 414 with an encrypted value of $\delta_1\delta_2\delta_3\delta_4$.

As described in operation 324, the encrypted data processing component 122 may send the binary tree 400 of encrypted values to the data provider 124. As described in operation 326, the data provider 124 may decrypt, such as using the private key that corresponds to the public key provided by the data provider 124, the vertices of the encrypted binary tree 400. The decryption of the vertices of the encrypted binary tree 400 may result in values 416, 418, 420, 422, 424, 426, 428. The data provider 124 may construct a binary tree with the decrypted values 416, 418, 420, 422, 424, 426, 428 that correspond to the encrypted values of nodes 402, 404, 406, 408, 410, 412, 414. The data provider 12 may send the decrypted binary tree to the encrypted data processing component 122 as described in operation 328.

As described in operation 330, the encrypted data processing component 122 may traverse the binary tree 400 with the decrypted values. The encrypted data processing component 122 may traverse the binary tree 400 to identify nodes with a decrypted value of zero. The traversal may ultimately result in identifying the leaf nodes of the binary tree 400 with a decrypted value of zero, and thus a positive match for the search term. For example, as shown in FIG. 4, the encrypted data processing component 122, using the decrypted values for the binary tree 400 received from the data provider 124, may start at the root node 414 and determine the root node 414 decrypted value 416 is equal to zero. This may indicate that a match exists and the search term is present in the search index. The encrypted data processing component 122 may continue traversing the binary tree 400, moving to the next level below the root node 414. Continuing the example in FIG. 4, the decrypted value 418 for the branch node 410 is not equal to zero, thus none of the children of branch node 410 is equal to zero and the traversal past branch node 410 may end. The decrypted value 420 for branch node 412 is equal to zero and thus at least one of the children of branch node 412 may be equal to zero, so the traversal from branch node 412 continues to the children, leaf node 406 and leaf node 408. The decrypted value 426 for the leaf node 406 is not equal to zero, thus the term of the search index corresponding to leaf node 406 is not a match. However, the decrypted value 428 for the leaf node 408 is equal to zero, and thus a match for the search term and the term of the search index corresponding to the leaf node 408.

The leaf nodes of the binary tree 400 that have a decrypted value of zero, if any are present, may indicate the matching terms of the search index. As described in operations 332 and 334, the encrypted data processing component 122 may identify the matching terms from the zero value leaf nodes and send the results to the data requestor 120.

In some embodiments, building the binary tree may not be needed to identify an initial match. However, the binary tree serves as a means to optimize the search for leaf nodes with a value of zero, or zero deltas. In some embodiments, caching may be used to optimize the multiplications. In some embodiments, the delta products may be broken down into parts that may be precomputed when the search index is built. For example, equation (7) may represent a delta product.

$$\delta_1\delta_2 = \Sigma r_{i1}e_{i1} - r_{i1}q_i\Sigma r_{i2}e_{i2} - r_{i2}q_i \quad (7)$$

Equation (8) may represent further deconstruction of equation (7).

$$\delta_1\delta_2 = (\Sigma r_{i1}e_{i1} - \Sigma r_{i1}q_i)(\Sigma r_{i2}e_{i2} - \Sigma r_{i2}q_i) \quad (8)$$

Equation (9) may represent final deconstruction of equations (7) and (8), such that portions of equation (9) may be isolated for precomputing.

$$\delta_1\delta_2 = (\Sigma r_{i1}e_{i1}\Sigma r_{i2}e_{i2}) - (\Sigma r_{i1}e_{i1}\Sigma r_{i2}q_i) - (\Sigma r_{i1}q_i) - (\Sigma r_{i1}q_i\Sigma r_{i2}e_{i2}) + (\Sigma r_{i1}q_i\Sigma r_{i2}q_i) \quad (9)$$

Some parts of the equation (9) may be precomputed, such as $(\Sigma r_{i1}e_{i1}\Sigma r_{i2}e_{i2})$, $\Sigma r_{i1}e_{i1}$, and $\Sigma r_{i2}e_{i2}$. Precomputing these part may further reduce the number of operations and computations. These operands may be at the first non-leaf node level, or parent branch nodes of the leaf nodes, of the binary tree. For the branch levels above, the same decomposition and precomputations may be performed. Thus, the resulting precomputed operands for each level of the binary tree may be stored in a similar binary tree structure for faster indexing.

Figure 5:
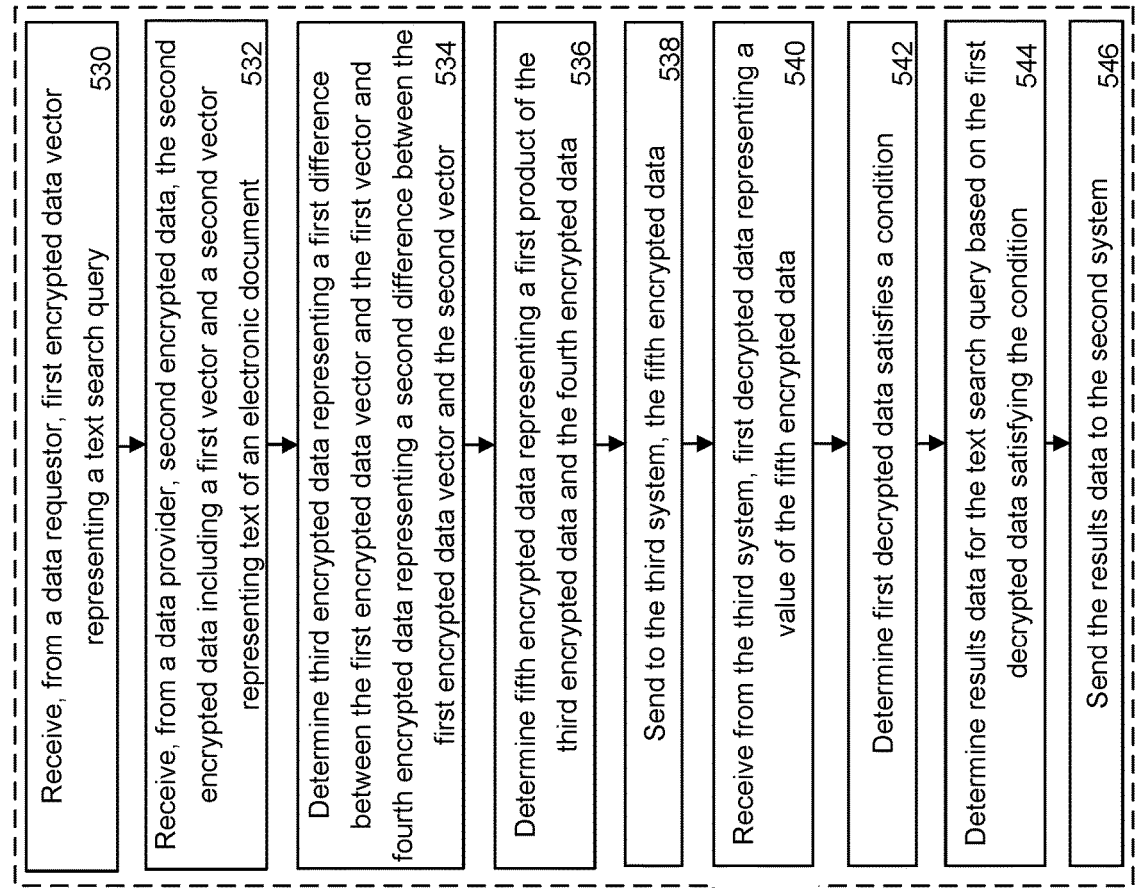
FIG. 5 illustrates operations of a system configured to perform an encrypted text search according to embodiments of the present disclosure.
Figure 5:
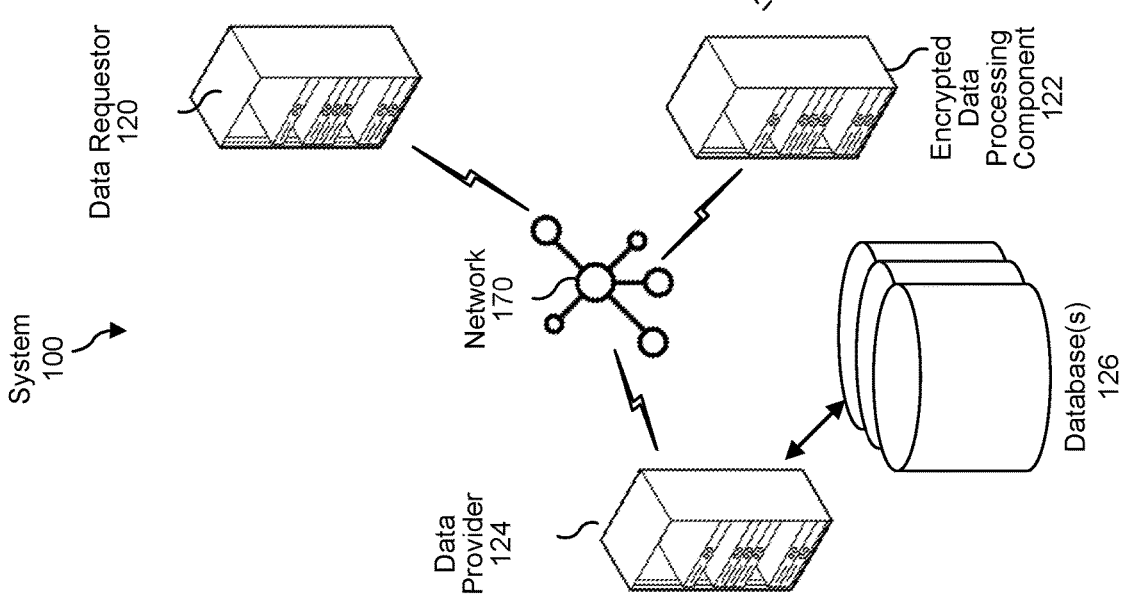

FIG. 5 illustrates operations of a system configured to perform an encrypted text search according to embodiments of the present disclosure. In accordance with the present disclosure, a first system (e.g., the encrypted data processing component 122) may receive (530), from second system (e.g., the data requestor 120) a first encrypted data vector representing a text search query, the first encrypted data vector may be encrypted using public-key data. As explained in greater detail below, the second system (e.g., the data requestor 120) may receive the public-key data from the first system (e.g., the encrypted data processing component 122). For example, the first system (e.g., the encrypted data processing component 122) may broadcast the public-key data to clients, such as the second system (e.g., the data requestor 120). The first system (e.g., the encrypted data processing component 122) may receive the public-key data from a third system (e.g., the data provider 124), where the third system may hold the private-key data corresponding to the public-key data.

The first system (e.g., the encrypted data processing component 122) may receive (532), from the third system (e.g., the data provider 124), second encrypted data, the second encrypted data including a first vector and a second vector representing text of an electronic document. The second encrypted data may be encrypted by the third system using the public-key data. The vectors representing the text of the electronic document may be determined using an embedding transformation applied to the text of the electronic document, which is further detailed with the description in reference to FIG. 2. For example, the first system may determine the first and second vector from the electronic document using the Levenshtein edit distance and as represented in equation (1).

In some embodiments, the first system (e.g., the encrypted data processing component 122) may generate a random vector, or a salt. Upon receiving the first encrypted data and/or the second encrypted data, the first system may multiply the first encrypted data vector and the random vector to determine a salted first encrypted data vector. For example, the first system may use equation (5) to determine the salted first encrypted data vector from the random vector and the first encrypted data vector.

Further, the first system may multiply the first vector of the second encrypted data and the random vector, as well as multiply the second vector of the second encrypted data and the random vector, to determine salted second encrypted data. For example, the first system may use equation (5) to determine the salted second encrypted data vector by multiplying each vector of the second encrypted data vector and the random vector. In the following operations described in reference to FIG. 1, the salted first encrypted data vector may be used instead of the first encrypted data vector and the salted second encrypted data may be used instead of the second encrypted data.

In some embodiments, the first system (e.g., the encrypted data processing component 122) may determine (534) third encrypted data representing a first difference between the first encrypted data vector and the first vector of the second encrypted data. In some embodiments, the first system may determine (534) fourth encrypted data representing a second difference between the first encrypted data vector and the second vector of the second encrypted data. For example, the first system may use equation (6) to determine the first and second difference.

In response to determining the third and fourth encrypted data, the first system may determine (536) fifth encrypted data representing a first product of the third encrypted data and the fourth encrypted data. In some embodiments, the fifth encrypted data may include a binary tree. The binary tree may comprise at least the third encrypted data, the fourth encrypted data, and the first product. For example, the first product may be the root node of the binary tree with the third encrypted data and the fourth encrypted data as the leaf nodes of the root node. As described in reference to FIG. 3B, the differences, or deltas, of each vector from the search index and the first encrypted data vector, or search query, may be recursively multiplied in pairs to form the binary tree.

In some embodiments, the first system (e.g., the encrypted data processing component 122) may send (538) the fifth encrypted data to the third system (e.g., the data provider 124). The third system may determine first decrypted data by decrypting the fifth encrypted data, such as with the private-key data corresponding to the public-key data. In some embodiments, the first decrypted data may represent values corresponding to vertices of the binary tree. As described in reference to FIG. 4, the values may be evaluated as either zero or non-zero values, with zero value representing a match of the search query.

In some embodiments, the first system (e.g., the encrypted data processing component 122) may receive (540) the first decrypted data representing a value of the fifth encrypted data from the third system (e.g., the data provider 124). The first system may determine (542) if the value represented in the first decrypted data satisfies a condition. For example, the first system may determine if the value is zero. The first system may determine (544) results data based on the determination of the value satisfying the condition. For example, if the value does not satisfy the condition, then search query did not match any terms of the electronic document and the results data may indicate that there were not any matches. Conversely, if the value does satisfy the condition, the first system may determine results data indicating a positive match of the search query and at least one term of the electronic document. The first system may send (546) the results data to the second system (e.g., the data requestor 120).

Figure 6:
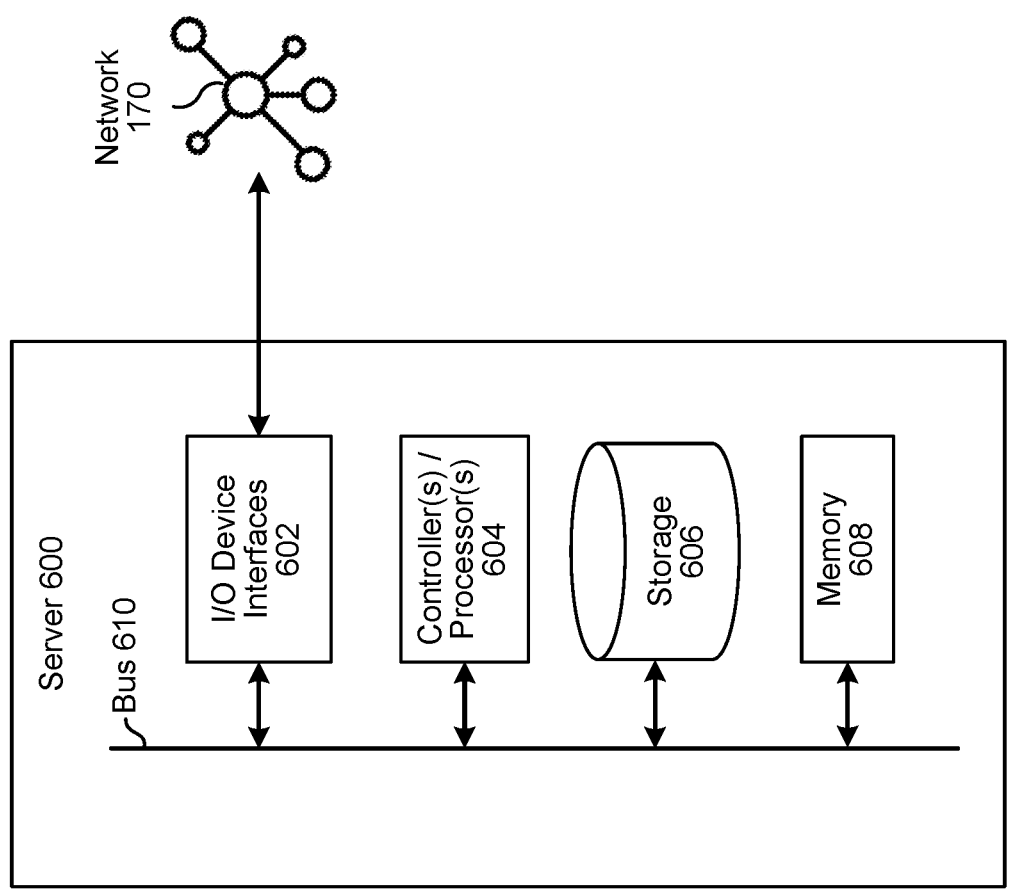
FIG. 6 illustrates components of a system according to embodiments of the present disclosure.

FIG. 6 is a block diagram illustrating a computing environment that includes a server 600; the server 600 may be the data requestor 120, the data provider 124, and/or the encrypted data processing component 122. The server 600 may include one or more input/output device interfaces 602 and controllers/processors 604. The server 600 may further include storage 606 and a memory 608. A bus 610 may allow the input/output device interfaces 602, controllers/processors 604, storage 606, and memory 608 to communicate with each other; the components may instead or in addition be directly connected to each other or be connected via a different bus.

A variety of components may be connected through the input/output device interfaces 602. For example, the input/output device interfaces 602 may be used to connect to the network 170. Further components include keyboards, mice, displays, touchscreens, microphones, speakers, and any other type of user input/output device. The components may further include USB drives, removable hard drives, or any other type of removable storage.

The controllers/processors 604 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 568 may include volatile random access memory (RAM), non-volatile read only memory (ROM), non-volatile magnetoresistive (MRAM), and/or other types of memory. The storage 606 may be used for storing data and controller/processor-executable instructions on one or more non-volatile storage types, such as magnetic storage, optical storage, solid-state storage, etc.

Computer instructions for operating the server 600 and its various components may be executed by the controller(s)/processor(s) 604 using the memory 608 as temporary "working" storage at runtime. The computer instructions may be stored in a non-transitory manner in the memory 608, storage 606, and/or an external device(s). Alternatively, some or all of the executable instructions may be embedded in hardware or firmware on the respective device in addition to or instead of software.

Figure 7:
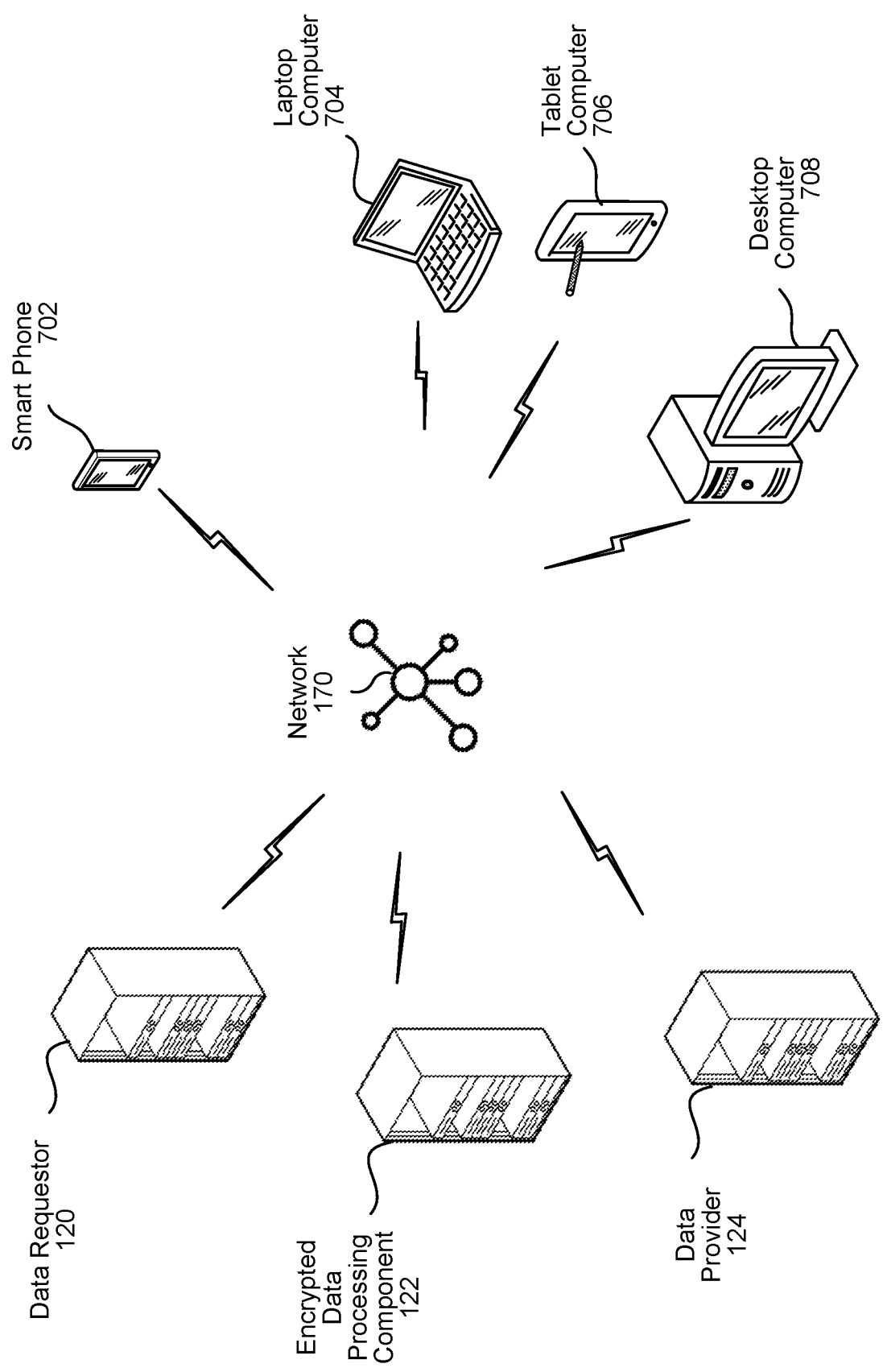
FIG. 7 illustrates a network according to embodiments of the present disclosure.

FIG. 7 illustrates a number of devices in communication with the data requestor 120, the data provider 124, and/or the encrypted data processing component 122 using the network 170. The devices may include a smart phone 702, a laptop computer 704, a tablet computer 706, and/or a desktop computer 708. These devices may be used to remotely access the data requestor 120, the data provider 124, and/or the encrypted data processing component 122 to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a first system from a second system, first encrypted data vector representing a text search query, wherein the first encrypted data vector is encrypted using a public key corresponding to a third system;
   receiving, at the first system from the third system, second encrypted data, the second encrypted data including a first vector and a second vector representing text of an electronic document, wherein the second encrypted data is encrypted using the public key;
   determining, by the first system, third encrypted data representing a first difference between the first encrypted data vector and the first vector of the second encrypted data;
   determining, by the first system, fourth encrypted data representing a second difference between the first encrypted data vector and the second vector of the second encrypted data;
   determining, by the first system, fifth encrypted data representing a first product of the third encrypted data and the fourth encrypted data;
   sending, from the first system to the third system, the fifth encrypted data;
   receiving, at the first system from the third system, first decrypted data representing a value of the fifth encrypted data, wherein the first decrypted data is determined by decrypting the fifth encrypted data using a private key corresponding to the public key;
   determining, by the first system, the first decrypted data satisfies a condition;
   determining, by the first system, results data for the text search query based on the first decrypted data satisfying the condition; and
   sending, from the first system to the second system, the results data.

2. The computer-implemented method of claim 1, further comprising:
   receiving, at the first system, the public key from the third system; and
   broadcasting, by the first system, the public key.

3. The computer-implemented method of claim 1, further comprising:
   generating, at the first system, a random vector;
   wherein the first encrypted data vector further includes determining a second product of the random vector and the first encrypted data vector; and
   wherein the second encrypted data further includes determining a third product of the first vector and the random vector and a fourth product of the second vector and the random vector.

4. The computer-implemented method of claim 1, wherein the fifth encrypted data includes a binary tree, the binary tree comprises at least the third encrypted data, the fourth encrypted data, and the first product; and
   wherein the first decrypted data represents values corresponding to vertices of the binary tree.

5. The computer-implemented method of claim 4, further comprising:
   determining, by the third system, the first decrypted data by decrypting the vertices of the binary tree using the private key corresponding to the public key; and
   sending, by the third system, the first decrypted data to the first system.

6. The computer-implemented method of claim 5, further comprising:
   determining, from the first decrypted data, a root node of the binary tree does not satisfy the condition; and
   determining the results data based on the root node not satisfying the condition.

7. The computer-implemented method of claim 5, further comprising:
   determining, from the first decrypted data, a root node of the binary tree satisfies the condition;
   traversing the binary tree to identify a leaf node that satisfies the condition; and
   determining the results data based on the leaf node satisfying the condition.

8. The computer-implemented method of claim 1, wherein the first system determines the first decrypted data satisfies the condition of having a value of zero.

9. The computer-implemented method of claim 1, further comprising:
   determining, by the third system, at least the first vector and the second vector representing the text of the electronic document using an embedding transformation on the electronic document; and
   determining, by the second system, the first encrypted data vector using the embedding transformation on the text search query.

10. The computer-implemented method of claim 1, further comprising:
    determining a fifth product of the first difference and an invertible matrix;
    determining the fifth product satisfies the condition; and
    updating the results data based on the fifth product satisfying the condition.

11. A system comprising:
at least one processor; and
at least one memory including instructions that, when executed by the at least one processor, cause the system to:
receive, at a first system from a second system, first encrypted data vector representing a text search query, wherein the first encrypted data vector is encrypted using a public key corresponding to a third system;
receive, at the first system from the third system, second encrypted data, the second encrypted data including a first vector and a second vector representing text of an electronic document, wherein the second encrypted data is encrypted using the public key;
determine, by the first system, third encrypted data representing a first difference between the first encrypted data vector and the first vector of the second encrypted data;
determine, by the first system, fourth encrypted data representing a second difference between the first encrypted data vector and the second vector of the second encrypted data;
determine, by the first system, fifth encrypted data representing a first product of the third encrypted data and the fourth encrypted data;
send, from the first system to the third system, the fifth encrypted data;
receive, at the first system from the third system, first decrypted data representing a value of the fifth encrypted data, wherein the first decrypted data is determined by decrypting the fifth encrypted data using a private key corresponding to the public key;
determine, by the first system, the first decrypted data satisfies a condition;
determine, by the first system, results data for the text search query based on the first decrypted data satisfying the condition; and
send, from the first system to the second system, the results data.

12. The system of claim 11, wherein the at least one memory further includes instructions, that, when executed by the at least one processor, further cause the system to:
receive, at the first system, the public key from the third system; and
broadcast, by the first system, the public key.

13. The system of claim 11, wherein the at least one memory further includes instructions, that, when executed by the at least one processor, further cause the system to:
generate, at the first system, a random vector;
wherein the first encrypted data vector further includes determining a second product of the random vector and the first encrypted data vector; and
wherein the second encrypted data further includes determining a third product of the first vector and the random vector and a fourth product of the second vector and the random vector.

14. The system of claim 11, wherein the fifth encrypted data includes a binary tree, the binary tree comprises at least the third encrypted data, the fourth encrypted data, and the first product; and
wherein the first decrypted data represents values corresponding to vertices of the binary tree.

15. The system of claim 14, wherein the at least one memory further includes instructions, that, when executed by the at least one processor, further cause the system to:
determine, by the third system, the first decrypted data by decrypting the vertices of the binary tree using the private key corresponding to the public key; and
send, by the third system, the first decrypted data to the first system.

16. The system of claim 15, wherein the at least one memory further includes instructions, that, when executed by the at least one processor, further cause the system to:
determine, from the first decrypted data, a root node of the binary tree does not satisfy the condition; and
determine the results data based on the root node not satisfying the condition.

17. The system of claim 15, wherein the at least one memory further includes instructions, that, when executed by the at least one processor, further cause the system to:
determine, from the first decrypted data, a root node of the binary tree satisfies the condition;
traverse the binary tree to identify a leaf node that satisfies the condition; and
determine the results data based on the leaf node satisfying the condition.

18. The system of claim 11, wherein the first system determines the first decrypted data satisfies the condition of having a value of zero.

19. The system of claim 11, wherein the at least one memory further includes instructions, that, when executed by the at least one processor, further cause the system to:
determine, by the third system, at least the first vector and the second vector representing the text of the electronic document using an embedding transformation on the electronic document; and
determine, by the second system, the first encrypted data vector using the embedding transformation on the text search query.

20. The system of claim 11, wherein the at least one memory further includes instructions, that, when executed by the at least one processor, further cause the system to:
determine a fifth product of the first difference and an invertible matrix;
determine the fifth product satisfies the condition; and
update the results data based on the fifth product satisfying the condition.

* * * * *